United States Patent [19]

Tougou

[11] Patent Number: 5,461,623
[45] Date of Patent: Oct. 24, 1995

[54] DATA TRANSMISSION SYSTEM WITH ABNORMALITY DISCRIMINATION

[75] Inventor: Hisashi Tougou, Himeji, Japan

[73] Assignee: Mitsubishi Denki Kabushiki Kaisha, Tokyo, Japan

[21] Appl. No.: 172,153

[22] Filed: Dec. 23, 1993

[30] Foreign Application Priority Data

Dec. 28, 1992 [JP] Japan .................................. 4-348429

[51] Int. Cl.$^6$ ............................... H04L 1/00; H04Q 1/20
[52] U.S. Cl. ................ 370/85.1; 370/110.1; 340/825.16
[58] Field of Search ...................... 370/13, 110.1, 370/17, 85.1, 99; 340/825.16, 825.53, 870.13; 371/20.1

[56] References Cited

U.S. PATENT DOCUMENTS 4,727,541  2/1988  Mori et al. ....................... 370/110.1 X
4,939,725  7/1990  Matsuda et al. ................. 370/110.1 X

*Primary Examiner*—Melvin Marcelo
*Attorney, Agent, or Firm*—Sughrue, Mion, Zinn, Macpeak & Seas

[57] ABSTRACT

A receiving node of a data transmission system receives data frames transmitted from a transmitting node through a transmission line. Each frame includes a node abnormality discrimination flag and a plurality of bits representing normality/abnormality of respective sensors and actuators which supplies information to be transmitted. On the basis of the node abnormality discrimination flag and the information supply means abnormality bits, the receiving node discriminates an occurrence of abnormality of the transmitting node from that of the information supply means, and the occurrences of the abnormality of the respective sensors and actuators from each other.

6 Claims, 5 Drawing Sheets

5,461,623

DATA TRANSMISSION SYSTEM WITH ABNORMALITY DISCRIMINATION

BACKGROUND OF THE INVENTION

This invention relates to data transmission systems for transmitting and receiving data frames among a plurality of nodes through transmission lines, by which each frame includes a portion for indicating an occurrence of abnormality.

FIG. 8 is a block diagram showing the structure of a conventional data transmission system. A receiving node 101, for example, receives the data transmitted from a transmitting node 102 through a transmission line 104. A sensor 401 supplies the information to be transmitted to the transmitting node 102. The data is transmitted through the transmission line 104 being divided in a plurality of frames 501 through 504 501. FIG. 9 shows the format of a transmission frame of FIG. 8. The frame includes a frame information 601, data 602 (602-1, 602-2, -- ), abnormality judgment data 603, and a check code 604 (e.g., cyclic redundancy check code or parity check code).

The operation of the data transmission system of FIG. 8 is as follows. In FIG. 8, the transmitting node 102 transmits the data supplied from the sensor 401. The data is transmitted successively divided in a plurality of frames 501 through 504 501. The transmitting node 102 increments the value of the abnormality judgment data 603 each time a frame is transmitted. Upon receiving a frame, the receiving node 101 confirms the value of the abnormality judgment data 603 of the frame. If the value of the abnormality judgment data 603 is not updated (i.e., incremented), the receiving node 101 judges that some abnormality has occurred and the frame is abnormal.

Upon detecting an abnormality of the sensor 401, the transmitting node 102 transmits the frame without incrementing the value of the abnormality judgment data 603 since such sensor data is not useful for the control operation at the receiving node 101. The receiving node 101 judges that a frame is abnormal when the abnormality judgment data 603 thereof is not updated. When the frames having an un-updated abnormality judgment data 603 are received successively, the receiving node 101 judges that either the transmitting node 102 or the sensor 401 is abnormal.

By the way, FIG. 8 shows only one sensor 401 which supplies information. A plurality of sensors and actuators, however, supply information transmitted from a transmitting node to a receiving node 101.

The above conventional data transmission system, however, has the following disadvantage. Although the abnormality of the transmitting node and the information supply means (sensors and actuators) can be detected at the receiving node, the abnormality of the transmitting node and that of the information supply means cannot be distinguished from each other. The receiving node judges that the whole transmission frame is abnormal even when the transmitting node is normal and only a part of the data supplied from the information supply means is abnormal. Thus the data supplied from normal sensors, etc., are discarded and cannot be utilized at the receiving node.

SUMMARY OF THE INVENTION

It is therefore an object of this invention to provide a data transmission system by which the abnormality of the transmitting node and that of the information supply means can be distinguished from each other at the receiving node, such that, when the transmitting node is normal and only part of the information supply means is abnormal, only the data items from the abnormal part of the information supply means are rendered void and discarded, while the data items from the normal part of the information supply means can be utilized.

The above object is accomplished in accordance with the principle of this invention by a data transmission system which comprises at least one transmitting node to which data to be transmitted is supplied from information supply means; at least one receiving node at which the data transmitted from the transmitting node is utilized; a transmission line connecting the transmitting node and receiving node, for transmitting the data from the transmitting node to the receiving node; wherein the data is transmitted from the transmitting node to the receiving node through the transmission line being divided in a plurality of frames each including: a first part indicating an occurrence of abnormality of the receiving node; and a second part indicating an occurrence of abnormality of the information supply means.

Preferably, the information supply means includes a plurality of sensors and actuators disposed at the transmitting node. The second part of the frame may include a plurality of bits corresponding to the sensors and actuators, respectively, and the first part of the frame may consist of a bit which is inverted by the transmitting node each time the frame is transmitted therefrom. Alternatively, the first part of the frame consists of a plurality of bits representing a number which is incremented by the transmitting node each time the frame is transmitted therefrom.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
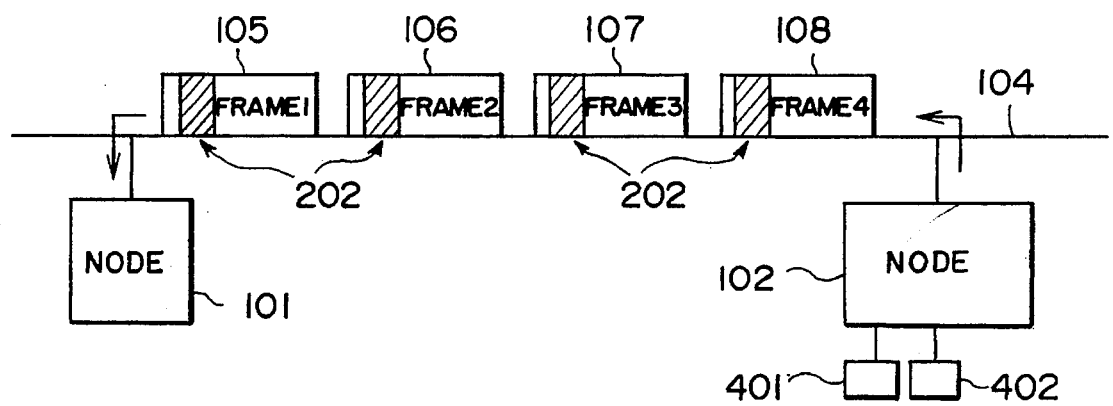
FIG. 1 is a block diagram showing the structure of a data transmission system according to this invention.

FIG. 1 is a block diagram showing the structure of a data transmission system according to this invention. A receiving node 101 receives the data transmitted from a transmitting node 102 through a transmission line 104. A sensor 401 and an actuator 402 supply the data to the transmitting node 102. The data may be various parameters of a part of an automated factory which are to be used in the control thereof at the receiving node 101. Although not shown in the figure, other sensors and actuators may also supply data transmitted from the transmitting node 102 to the receiving node 101. The transmitted data is divided into a plurality of transmission frames 105 through 108.

Figure 2:
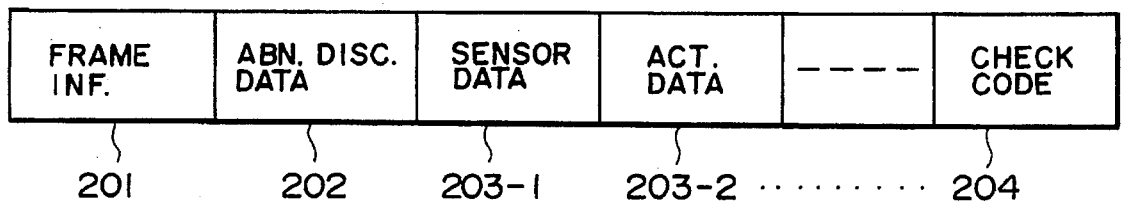
FIG. 2 shows the format of a transmission frame of FIG. 1.

FIG. 2 shows the format of a transmission frame of FIG. 1. The transmission frame includes: frame information 201 consisting of the priority information, the destination address (the address of the receiving node 101) and the source address (the address of the transmitting node 102); abnormality discrimination data 202 consisting of the node abnormality discrimination flag and the sensor and the actuator abnormality discrimination flags; data portion 203 (sensor data 203-1, actuator data 203-2, --) supplied from the sensor 401, actuator 402, etc.; and check code 204 (e.g., the cyclic redundancy check code or the parity check code) for confirming the correctness of the received frame.

Figure 3:
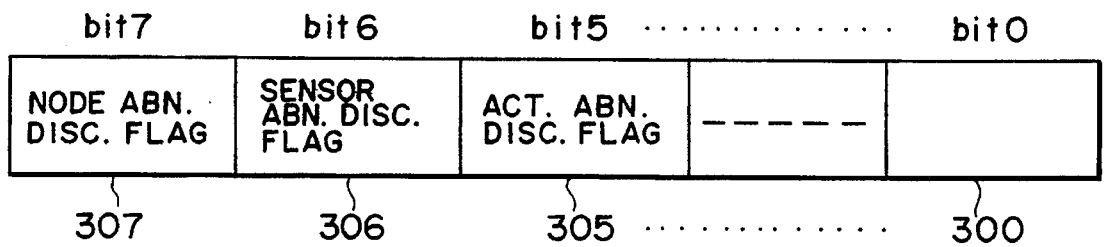
FIG. 3 shows the format of the abnormality discrimination data 202 of FIG. 2.

FIG. 3 shows the format of the abnormality discrimination data 202 of FIG. 2. The abnormality discrimination data 202 includes eight bits. The bit 7 is a node abnormality discrimination flag 307 and the bits 0 through 6 are the information supply means abnormality discrimination flags 300 through 306 for discriminating the normal/abnormal states of the respective units of the information supply means (the sensors and actuators supplying data to the transmitting node 102)

Figure 4:
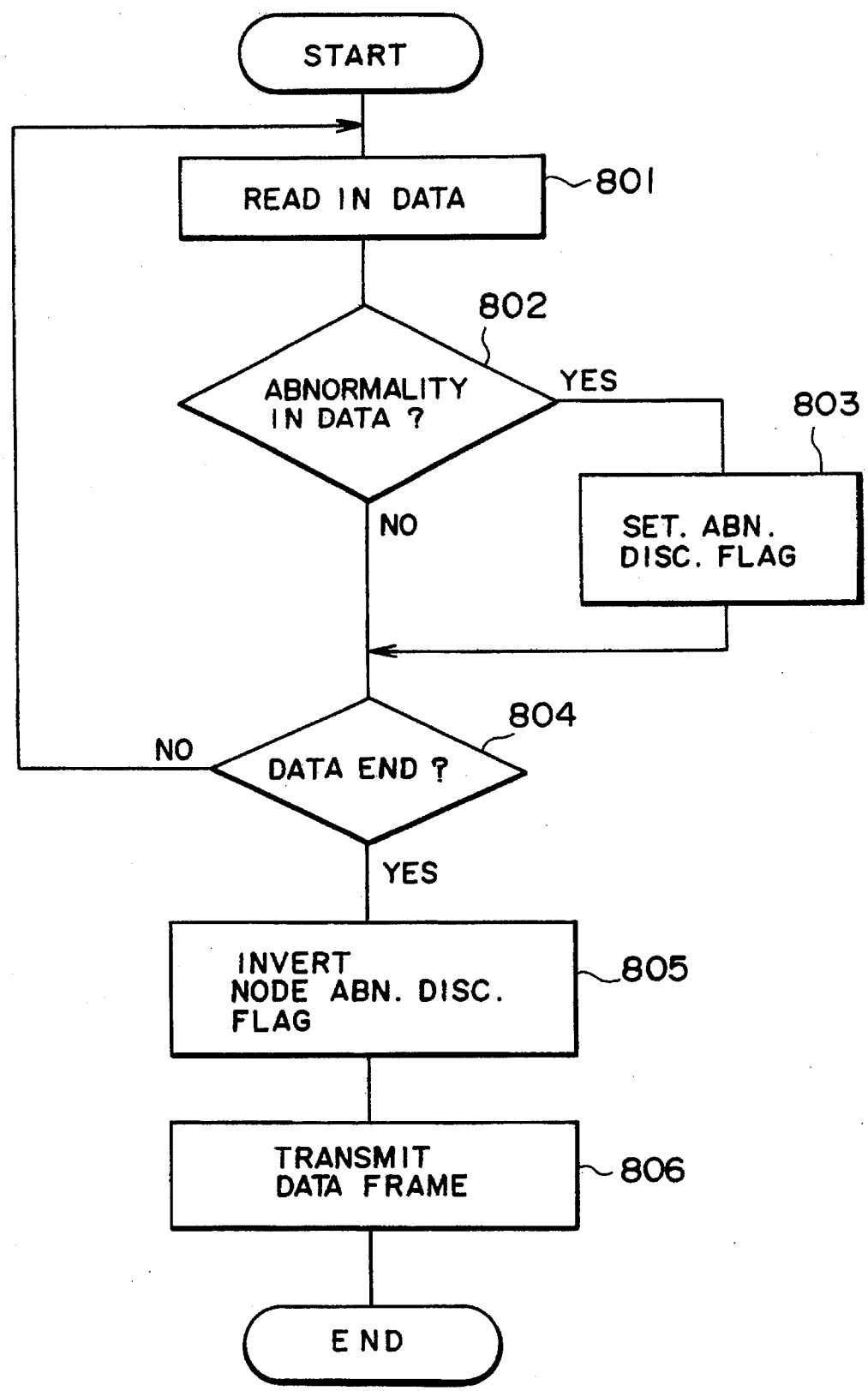
FIG. 4 is a flowchart showing the procedure according to which the transmitting node 102 transmits the frames.
Figure 5:
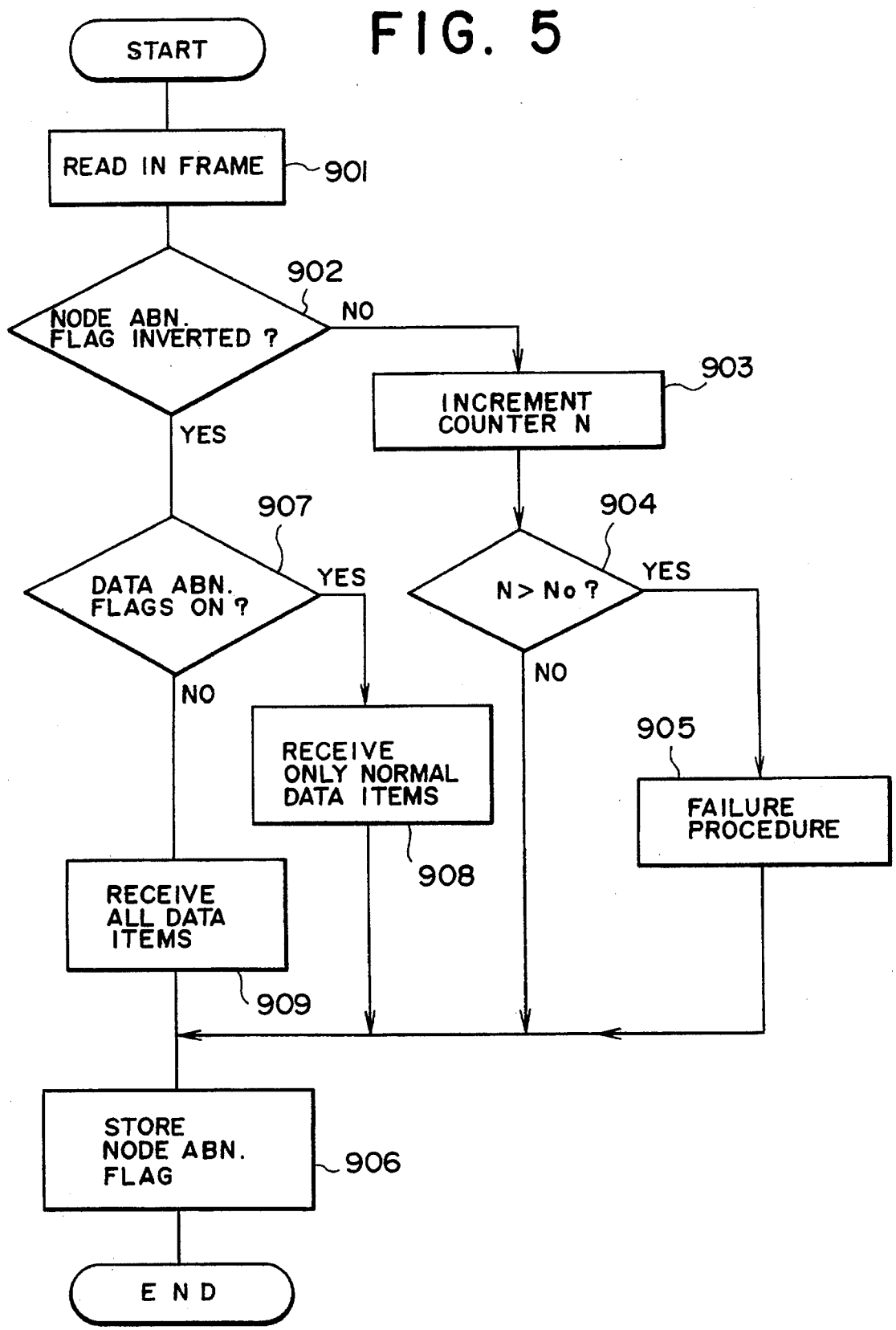
FIG. 5 is a flowchart showing the procedure according to which the receiving node 101 receives the frames.

Next, the operation of the data transmission system of FIG. 1 is described. FIG. 4 is a flowchart showing the procedure according to which the transmitting node 102 transmits the frames. FIG. 5 is a flowchart showing the procedure according to which the receiving node 101 receives the frames.

First the transmission operation at transmitting node 102 is described by reference to FIG. 4. At step S801, the transmitting node 102 reads in an information item supplied from one of the sensors and actuators, and stores the information item in the corresponding position (203-1, 203-2 --) in the data portion 203 of the transmission frame (see FIG. 2). At step S802 the transmitting node 102 judges whether or not the information item read in at step S801 contains an error indicating an occurrence of abnormality. If the judgement is affirmative at step S802 (i.e., the information item contains an error indicating an occurrence of abnormality) the flag (one of the bits 0 through 6 in the abnormality discrimination data 202 of FIG. 3) corresponding to the information item is set. If the judgement is negative at step S802 (i.e., the information item indicates no abnormality), the execution proceeds directly to step S804, where it is judged whether or not all the data items from the sensor 401, the actuator 402, etc., of the information supply means have been read in. If the judgement is negative at step S804 (i.e., there remain a data item of the information supply means not yet read in), the execution returns to step S801 to repeat the steps S801 through S804. Otherwise, the execution proceeds to step S805, where the node abnormality discrimination flag 307 is inverted (with respect to the value thereof of the preceding frame). Next at step S806, the frame information 201 and the check code 204 are calculated and filled in and the complete frame 105 is transmitted from the transmitting node 102 to the receiving node 101 through the transmission line 104. The procedure of FIG. 4 is repeated to transmit the frames 106, 107, 108, etc., successively from the transmitting node 102 to the receiving node 101 through the transmission line 104.

Next the reception operation at the receiving node 101 is described by reference to FIG. 5.

At step S901, a transmission frame is read in. Next at step S902, it is judged whether or not the node abnormality discrimination flag 307 of the current frame is inverted with respect to the node abnormality discrimination flag 307 of the preceding frame. (The node abnormality discrimination flag 307 of the preceding frame is stored at step S906 in the preceding execution cycle of the frame reception procedure of FIG. 5.) If the judgement is affirmative at step S902 (i.e., the node abnormality discrimination flag 307 is inverted), the transmitting node 102 is inferred to be operating normally. Thus the execution proceeds to step S907, where it is judged whether or not any one of the bits 0 through 6 (i.e., the abnormality discrimination flags 300 through 306 corresponding to respective sensors and actuators) of the abnormality discrimination data 202 of the current frame is set. If the judgement is negative at step S907 (i.e., none of the bits 300 through 306 are set), the data items are all inferred to be correct. Thus the execution proceeds to step S909, where all the data items 203-1, 203-2, -- are stored to be utilized in the control operation at the receiving node 101. If the judgement is negative at step S908, the execution proceeds to step S908, where only the data items 203-1, 203-2, -- corresponding to the abnormality discrimination flag 300 through 306 which are not set are utilized in the control operation at the receiving node 101. The data items 203-1, 203-2, -- corresponding to the abnormality discrimination flag 300 through 306 which are set are judged to be abnormal and discarded. For example, if the sensor abnormality discrimination flag 306 is set but the actuator abnormality discrimination flag 305 is not set, the sensor data 203-1 is discarded while the actuator data 203-2 is preserved. After steps S908 and S909, the execution proceeds to step S906, where the abnormality discrimination data 202 of the current frame is stored.

If the judgement is negative at step S902, the transmitting node 102 is inferred to be operating abnormally. Thus the execution proceeds to step S903, where the counter N is incremented. (When the data transmission system is started anew, the counter N is reset to 0.) Next at step S904, it is judged whether or not the counter N is greater than a predetermined positive whole number No (i.e., whether N>No). If the judgement is affirmative at step S904 (i.e., N>No), it is judged that the natural recovery of the transmitting node 102 is impossible and the execution proceeds to step S905, where the a procedure for dealing with the failure of transmitting node 102 is performed. After the failure is thus dealt with, the execution proceeds to step S906. If the judgement is negative at step S904 (i.e., N≦No), the execution proceeds to step S906. The abnormality discrimination data 202 of the current frame is thus stored and the execution cycle of the frame reception procedure of FIG. 5 is terminated. The procedure of FIG. 5 is repeated to receive the successive frames 105, 106, 107, 108, --.

As described above the abnormality of the transmitting node 102 and the occurrences of abnormality at of the respective sensor 401 and actuator 402, etc., can be discriminated from each other at the receiving node 101. Thus in the case where some of the sensors and actuators are operating abnormally while the others are normal, the remaining normal data items can be utilized at the receiving node 101. The reliability of the data transmission system is thus improved.

In the above description the node 101 receives the data from the node 102. However, the data may be transmitted in an opposite direction, from the node 101 to the node 102. Further, more than two nodes may be connected through a transmission line 104 such that the data may be transmitted among them.

Figure 6:
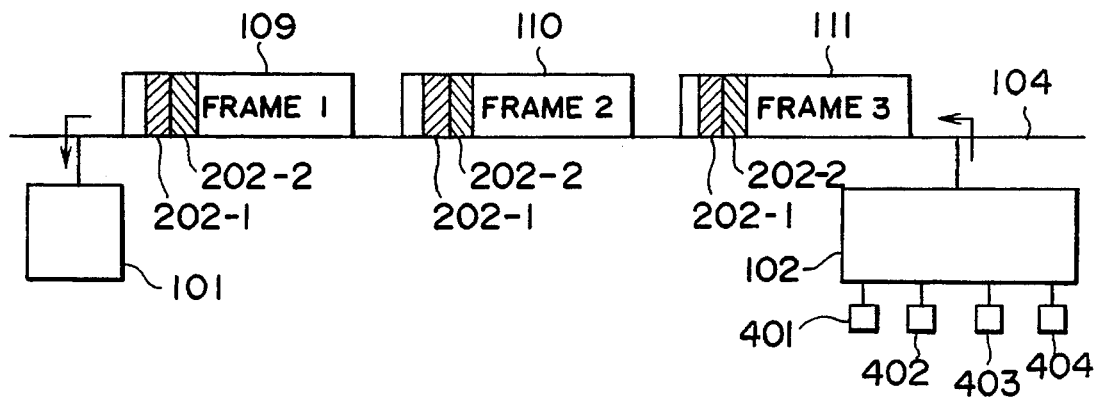
FIG. 6 is a block diagram showing the structure of another data transmission system according to this invention.

FIG. 6 is a block diagram showing the structure of another data transmission system according to this invention. A receiving node 101 receives the data transmitted from a transmitting node 102 through a transmission line 104. Sensors 401 and 402 and actuators 403 and 404 supply the data (e.g., the various parameters of an automated factory) to the transmitting node 102. Although not shown in the figure, other sensors and actuators may also supply data transmitted from the transmitting node 102 to the receiving node 101. The data is transmitted divided into a plurality of transmission frames 109 through 111.

Figure 7:
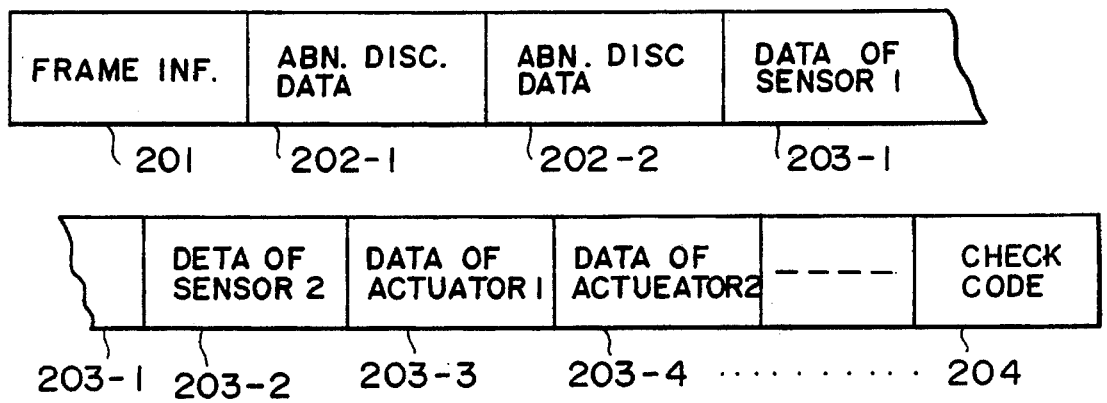
FIG. 7 shows the format of a frame transmitted from a transmitting node in FIG. 6.
Figure 8:
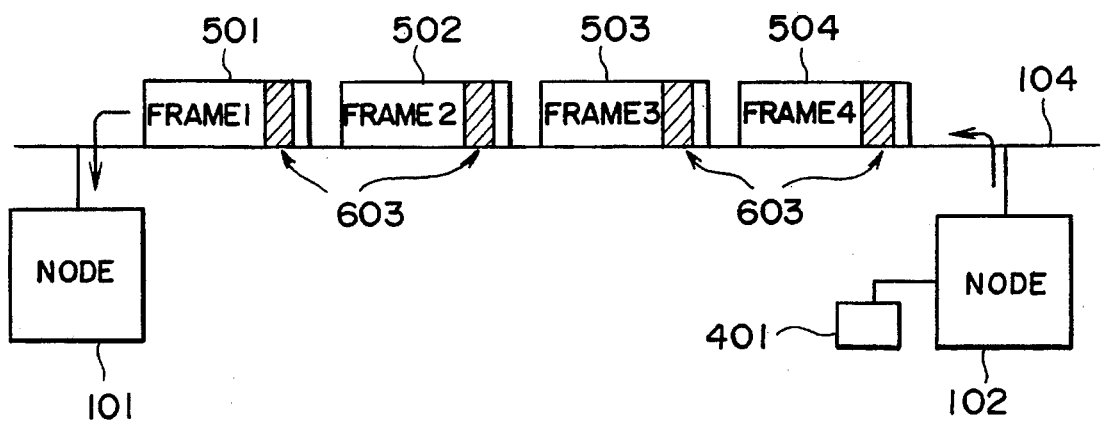
FIG. 8 is a block diagram showing the structure of a conventional data transmission system.
Figure 9:
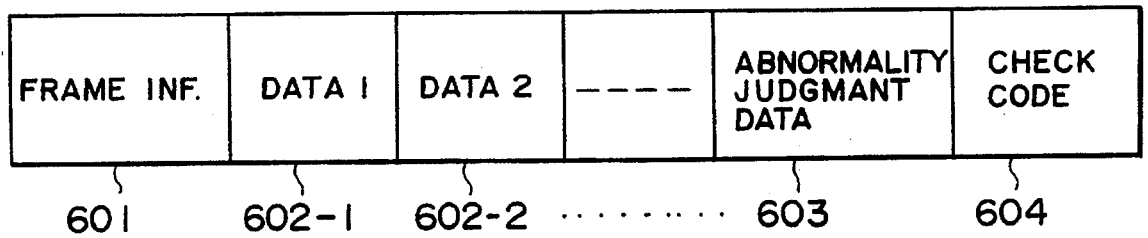
FIG. 9 shows the format of a transmission frame of FIG. 8.

FIG. 7 shows the format of a frame transmitted from a transmitting node in FIG. 6. The transmission frame includes: frame information 201 consisting of the priority information, the destination address and the source address (the address of the transmitting node 102); first abnormality discrimination data 202-1 (the node abnormality informing part) for indicating the normality/abnormality of the transmitting node 102; second abnormality discrimination data 202-2 for indicating the normality/abnormality of the information supply means (the sensors and the actuators) supplying the information at the transmitting node 102; data portion 203 (sensor data 203-1, actuator data 203-2, --) supplied from the sensors 401 and 402 and the actuators 403 and 404, etc.; and check code 204 (e.g., the cyclic redundancy check code or the parity check code) for confirming the correctness of the received frame.

The second abnormality discrimination data 202-2 consists of a plurality of flags corresponding to respective sensors and the actuators of the information supply means. As in the case of the data transmission system of FIG. 1, the bit pattern of the second abnormality discrimination data 202-2 indicates the occurrences of abnormality of respective sensors and actuators.

On the other hand, the first abnormality discrimination data 202-1 consists of a plurality of bits for representing a number and the judgment of the abnormality of the transmitting node is performed on the basis of the first abnormality discrimination data 202-1 as follows. The transmitting node 102 increments the value of the first abnormality discrimination data 202-1 each time a frame (109, 110, 111, --) is transmitted. The receiving node 101 judges whether or not the value of the first abnormality discrimination data 202-1 of the transmitted frame is incremented. If the value of the first abnormality discrimination data 202-1 is not updated (i.e., incremented), it is judged that an abnormality has occurred in the transmitting node 102 and the whole frame is inferred to be abnormal.

According to the embodiment of FIG. 1, not only the normality/abnormality of the respective sensors and the actuators, but also the normality/abnormality of the transmitting node 102 are represented by respective flags. According to the embodiment of FIG. 6, however, the normality/abnormality of the transmitting node 102 is indicated by whether or not the first abnormality discrimination data 202-1 is updated. The discrimination of the abnormality of the transmitting node from the abnormality of the information supply means can thus be accomplished.

What is claimed is:

1. A data transmission system comprising:
   at least one transmitting node to which data to be transmitted, is supplied from an information supply means;
   at least one receiving node at which said data transmitted from said transmitting node is utilized;
   a transmission line connecting said transmitting node and receiving node, for transmitting said data from said transmitting node to said receiving node;
   wherein said data is transmitted from said transmitting node to said receiving node through said transmission line being divided in a plurality of frames each comprising: a first part indicating an occurrence of an abnormality of said transmitting node; and a second part indicating an occurrence of an abnormality of said information supply means.

2. A data transmission system as claimed in claim 1, wherein said information supply means includes a plurality of sensors and actuators disposed at said transmitting node.

3. A data transmission system as claimed in claim 2, wherein said second part of said frame includes a plurality of bits corresponding to said sensors and actuators, respectively.

4. A data transmission system as claimed in claim 1, wherein said first part of said frame consists of a bit which is inverted by said transmitting node each time said frame is transmitted therefrom.

5. A data transmission system as claimed in claim 1, wherein said first part of said frame consists of a plurality of bits representing a number which is incremented by said transmitting node each time said frame is transmitted therefrom.

6. A data transmission system as claimed in claim 1, wherein said first part is separate from said second part.

* * * * *